US007954164B2

(12) United States Patent
Bentvelsen et al.

(10) Patent No.: US 7,954,164 B2
(45) Date of Patent: May 31, 2011

(54) METHOD OF COPY DETECTION AND PROTECTION USING NON-STANDARD TOC ENTRIES

(75) Inventors: Petrus Henricus Cornelius Bentvelsen, Eindhoven (NL); Paulus Franciscus Vollebregt, 's-Gravenhagen (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1191 days.

(21) Appl. No.: 10/511,218

(22) PCT Filed: Apr. 1, 2003

(86) PCT No.: PCT/IB03/01256
§ 371 (c)(1), (2), (4) Date: Oct. 13, 2004

(87) PCT Pub. No.: WO03/088241
PCT Pub. Date: Oct. 23, 2003

(65) Prior Publication Data
US 2005/0154961 A1 Jul. 14, 2005

(30) Foreign Application Priority Data
Apr. 18, 2002 (EP) .................................... 02076527

(51) Int. Cl.
*G06F 7/06* (2006.01)
*H04N 7/167* (2006.01)

(52) U.S. Cl. ......................................... 726/32; 380/201

(58) Field of Classification Search .................... 726/32; 380/204, 215, 201; 714/763, 707
See application file for complete search history.

(56) References Cited

U.S. PATENT DOCUMENTS

| | | | | |
|---|---|---|---|---|
| 4,641,295 | A * | 2/1987 | Furukawa et al. | 369/30.12 |
| 4,907,093 | A * | 3/1990 | Ryan | 386/94 |
| 5,805,551 | A * | 9/1998 | Oshima et al. | 705/57 |
| 5,948,136 | A * | 9/1999 | Smyers | 710/107 |
| 6,009,233 | A * | 12/1999 | Tsujimura et al. | 386/95 |
| 6,295,267 | B1 * | 9/2001 | Takaku et al. | 369/83 |
| 6,462,753 | B1 * | 10/2002 | Koyata et al. | 715/716 |
| 6,603,718 | B1 * | 8/2003 | Ozawa | 369/47.1 |
| 6,691,086 | B2 * | 2/2004 | Lokhoff et al. | 704/229 |
| 6,801,490 | B1 * | 10/2004 | Sako et al. | 369/53.31 |
| 2003/0012098 | A1 * | 1/2003 | Sako et al. | 369/47.12 |
| 2003/0086566 | A1 * | 5/2003 | Gooch | 380/200 |

FOREIGN PATENT DOCUMENTS

| | | | |
|---|---|---|---|
| JP | 03254470 | | 2/1992 |
| WO | 0074053 | A1 | 12/2000 |
| WO | WO 0074053 | * | 12/2000 |
| WO | 0141138 | | 6/2001 |
| WO | 03049107 | A2 | 6/2003 |

* cited by examiner

*Primary Examiner* — Eleni A Shiferaw

(57) ABSTRACT

The invention relates to a method of copy detection of a record carrier. In one particular embodiment the table of content entries are mastered on the record carrier in a detectable non-standard way, e.g. the sequence of table of content entries is mixed or the number of repetitions is varied. According to another embodiment additional synchronization symbols are used in one or more subcode frames which can be detected by a read-out device in order to distinguish between an original or a copy of a record carrier.

15 Claims, 7 Drawing Sheets

Figure 1:
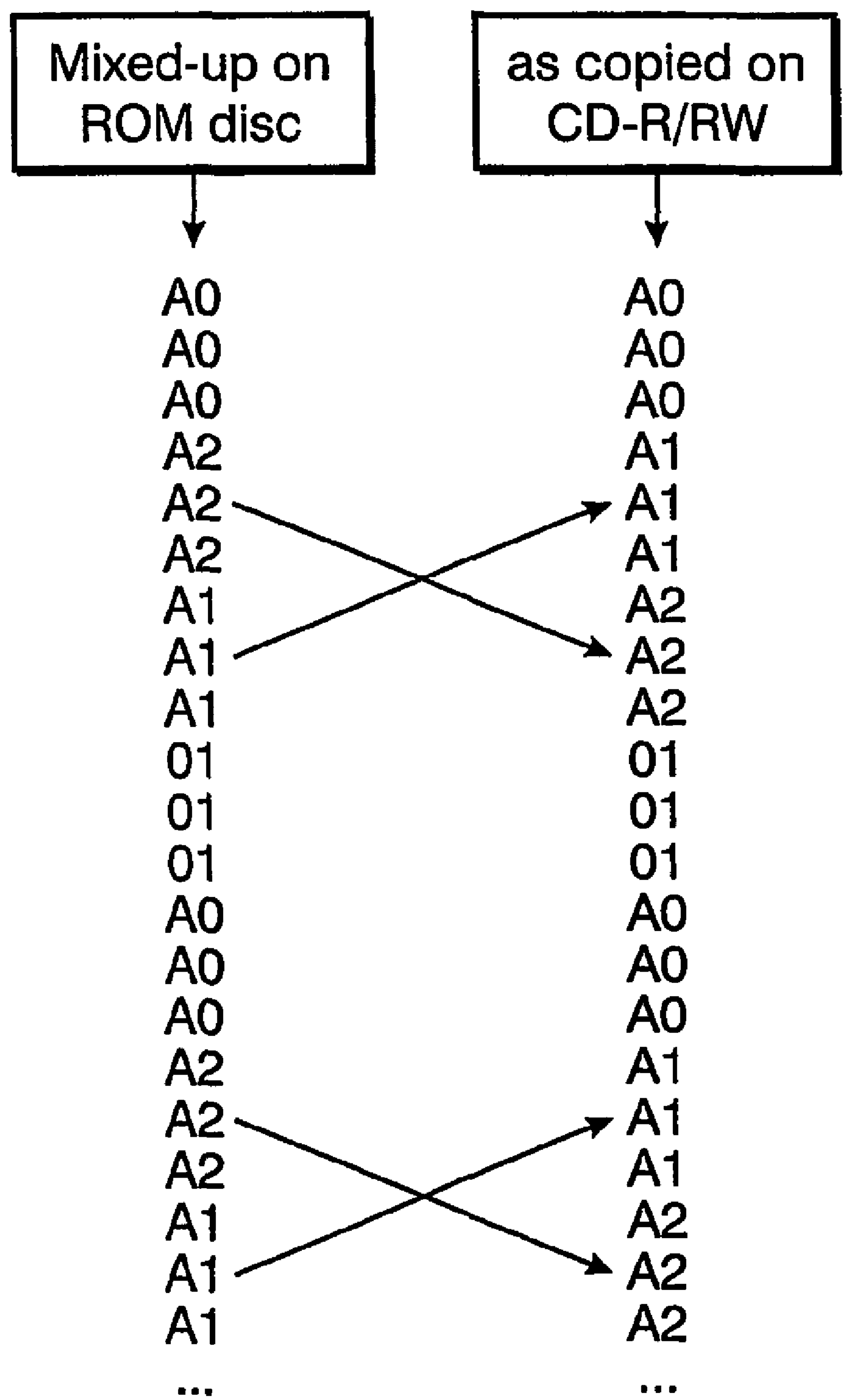

| Mixed-up on ROM disc | as copied on CD-R/RW |
|---|---|
| A0 | A0 |
| A0 | A0 |
| A0 | A0 |
| A2 | A1 |
| A2 | A1 |
| A2 | A1 |
| A1 | A2 |
| A1 | A2 |
| A1 | A2 |
| 01 | 01 |
| 01 | 01 |
| 01 | 01 |
| A0 | A0 |
| A0 | A0 |
| A0 | A0 |
| A2 | A1 |
| A2 | A1 |
| A2 | A1 |
| A1 | A2 |
| A1 | A2 |
| A1 | A2 |
| ... | ... |

METHOD OF COPY DETECTION AND PROTECTION USING NON-STANDARD TOC ENTRIES

The invention relates to a method of copy detection of a record carrier on which table of content (TOC) entries are mastered. The invention relates further to a method of read-out of such a record carrier, to corresponding apparatuses, to such a record carrier itself and to a computer program for implementing said methods.

WO 00/74053 A1 discloses a method of copy protecting a digital audio CD, wherein control data usable by a data reader is encoded on the compact disc. In order to copy protect the disc selected control data is rendered incorrect and/or inaccurate. An audio CD can thus be played normally on an audio player; however, the incorrect data renders the audio CD unplayable by a data reader such as a CD-ROM drive of a PC. In an embodiment disclosed therein, data in the table of contents of the CD is rendered incorrect, e.g. by setting the Atime from the start of the disc program area to lead-out to zero or by identifying audio tracks erroneously as data tracks.

It is often desired to generate a unique identifier of a record carrier by a distributor or sales point of said record carrier which can be used to distinguish between an original record carrier and a copied record carrier in an easy way. It is therefore an object of the present invention to provide a method of copy detection and protection of a record carrier which allows a replay device to distinguish between an original and a copy of a record carrier, but which does not generally render a copy unplayable e.g. by a data reader such as a CD-ROM drive when accessing an audio CD. Further, a corresponding method of read-out of such a record carrier shall be provided.

This object is achieved according to the present invention by a method as claimed in claim 1, wherein said table of content entries are mastered on said record carrier in a detectable non-standard way. This means, that the table of contents itself is accessible and readable by a conventional replay device. However, after a firmware change it will be enabled to detect if the record carrier is an original or a copy by checking if the table of content entries are mastered in the standard or a non-standard way. A conventional replay device accessing a record carrier on which the TOC entries are mastered in a non-standard way will reconstruct the correct TOC table into a standard way so that, when copying said record carrier to a recordable or rewritable record carrier, such as a CD-R/RW, the TOC entries will be written in the standard way. The term “non-standard” thus covers all possibilities of changes to the table of contents which still allow the reading of the table of contents by a conventional replay device, but which is detectable after a firmware change. The term “standard way” in this connection means any way which is conventionally used when mastering TOC entries on a record carrier, i.e. a way which is defined in a corresponding standard such as the Red Book for CD audio or the Yellow Book for CD-ROM or which is agreed upon by manufacturers and users of certain types of record carriers.

Preferred embodiments of the invention are defined in the dependent claims. A method of read-out of a record carrier on which table of content entries are mastered, comprising the steps of:

reading said table of content entries, checking if said table of content entries are mastered in a standard or a non-standard way, and outputting a signal indicating if said table of content entries are mastered in the standard or in a non-standard way.

There is hacker software available which enables a user to edit the TOC entries, to change their relative position and to add new TOC entries. According to preferred embodiments of the invention as defined in claims 2 to 4, non-standard ways of mastering the TOC entries on the record carrier are selected, which go beyond the possibilities of such hacking software or which can not be implemented in a straightforward way. For example, such hacking software does not allow to change the number of repeats of TOC entries which is, for CD audio, always three, and does not allow to copy e.g. subcode-Q mode-2 frames. Generally, any modification of the TOC affects the whole lead-in area.

An additional or alternative method of providing the possibility to distinguish between a copy and an original record carrier is defined in claim 5 comprising the steps of:

storing subcode data on said record carrier in subcode frames of a subcode channel, each subcode frame comprising synchronization symbols and data symbols at predetermined positions within said subcode frame, and assigning and storing a number of additional synchronization symbols to at least one subcode frame at positions provided for data symbols so that during read-out of said subcode channel a check signal can be generated indicating the presence or absence of said additional synchronization symbols.

According to said embodiment an interrupt could be generated as check signal during read-out in response to the detection of said additional synchronization symbols indicating that a synchronization is detected too early. Since such additional synchronization symbols do not correspond to correct subcode byte values, they can not be copied. When a record carrier including such additional synchronization symbols is copied, said additional synchronization symbols are mapped to correct subcode byte values, probably zero. As a result, the copied record carrier does not have additional synchronization symbols which allows to distinguish between an original and a copy.

Figure 2:
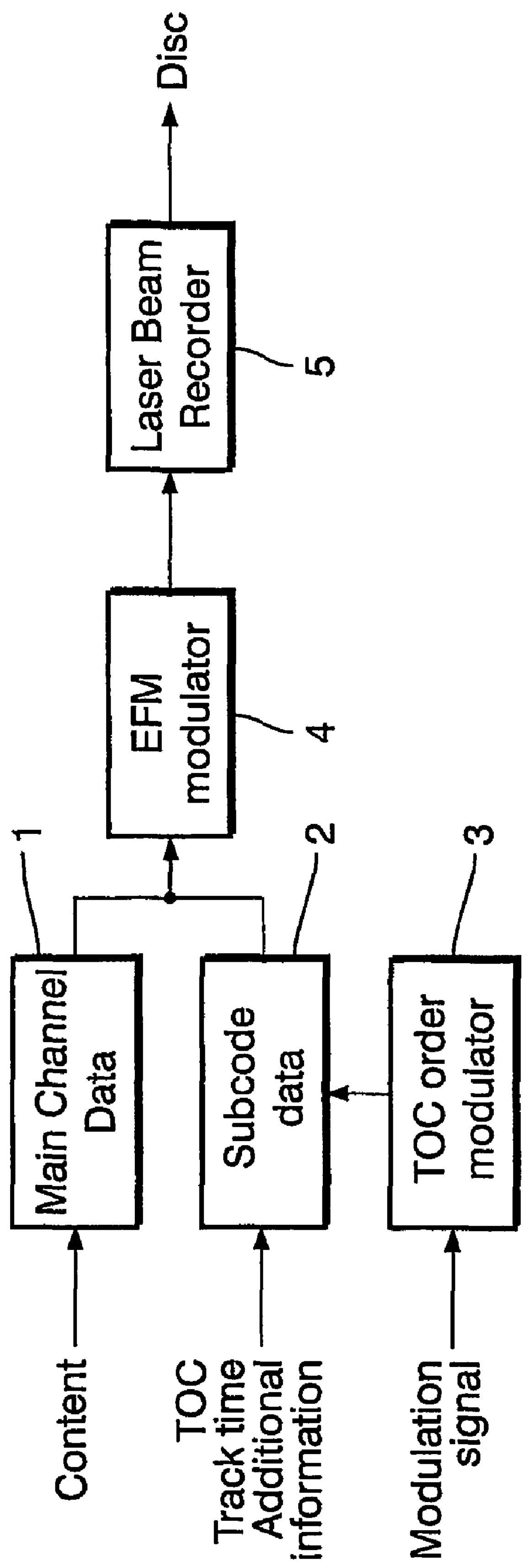
Figure 3:
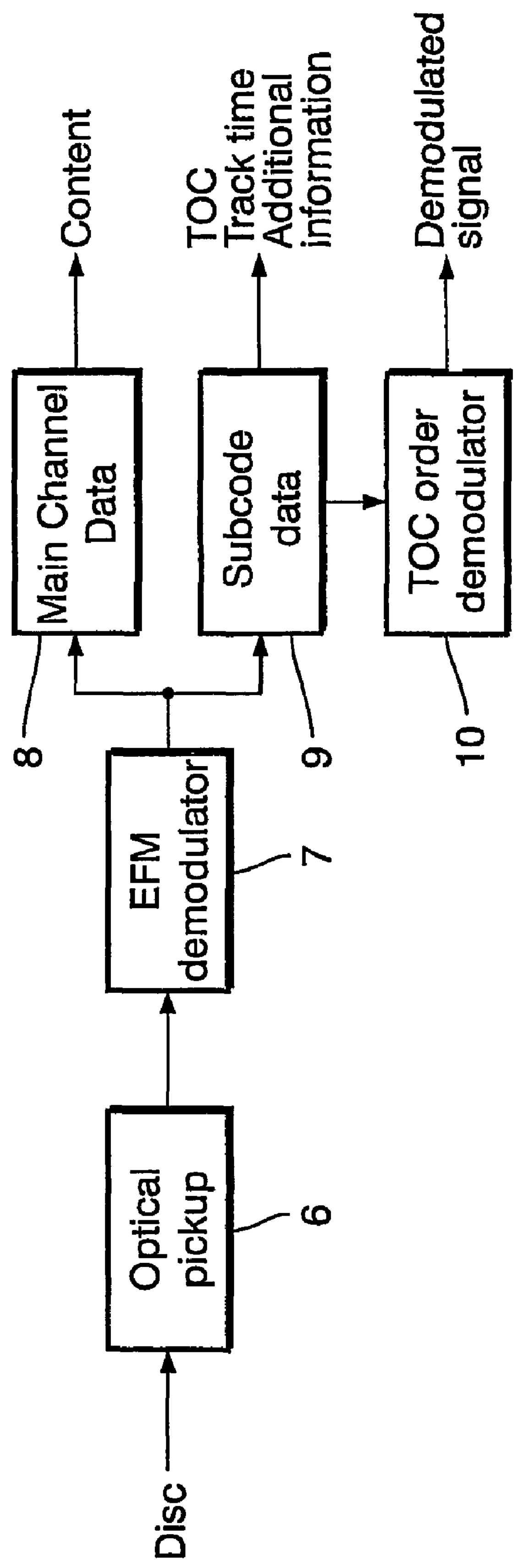
Figure 4:
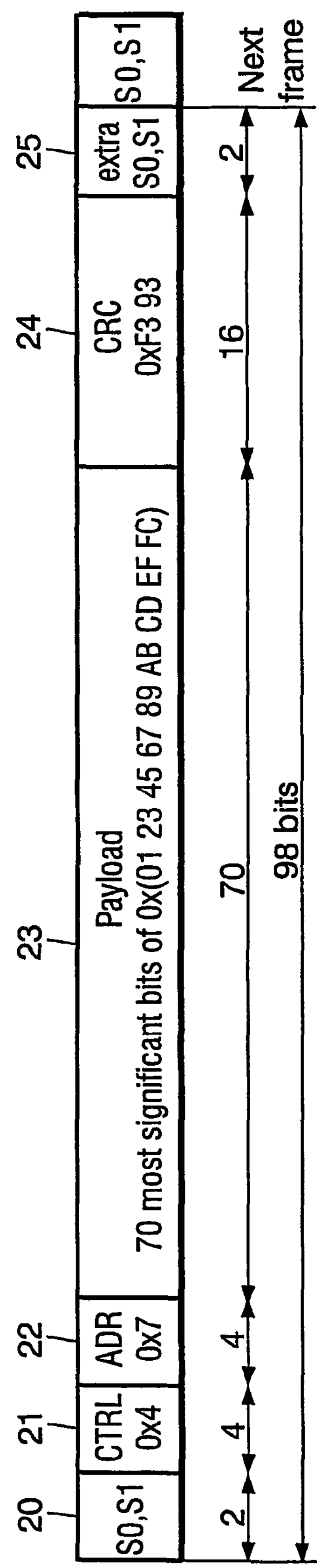
Figure 5:
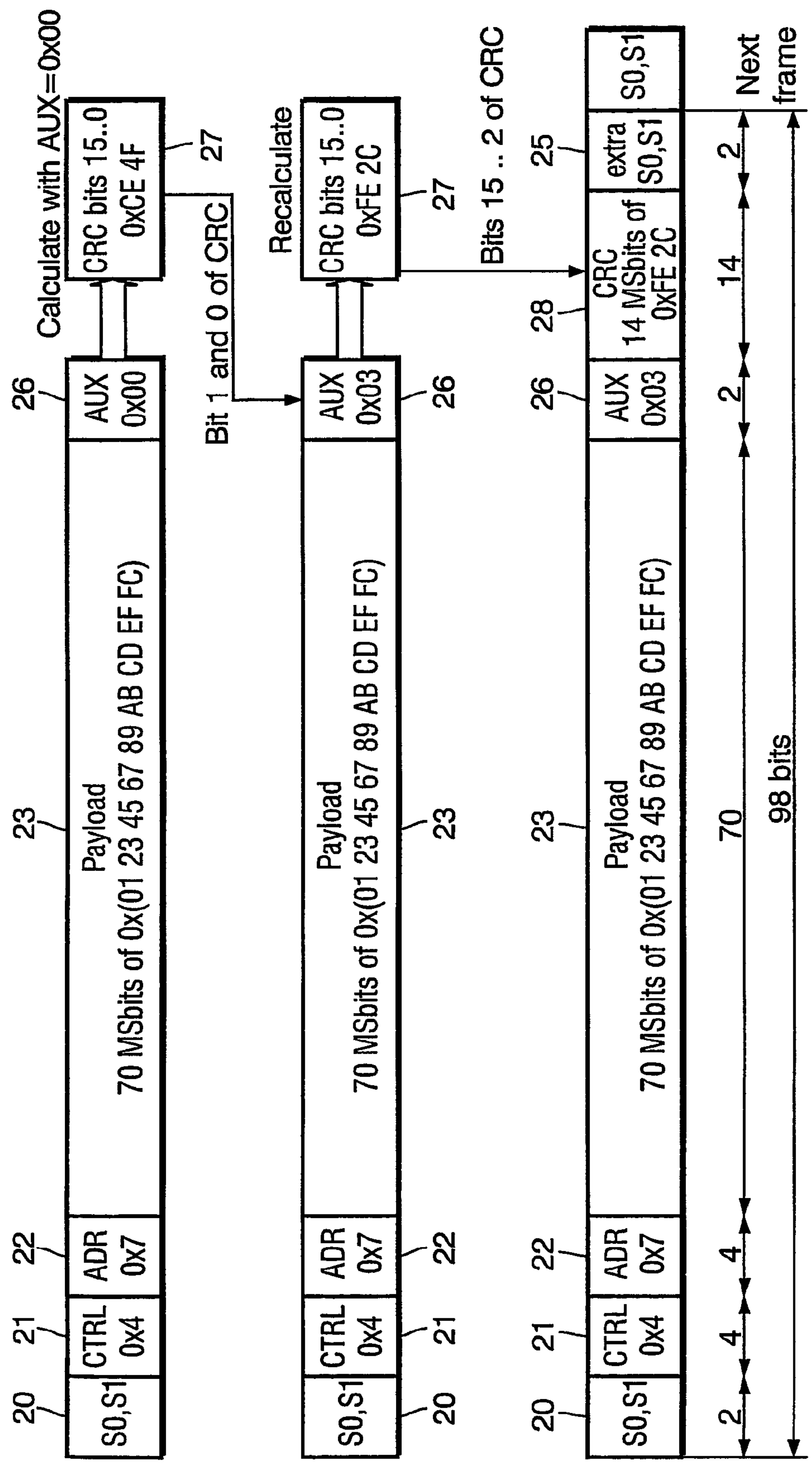
Figure 6:
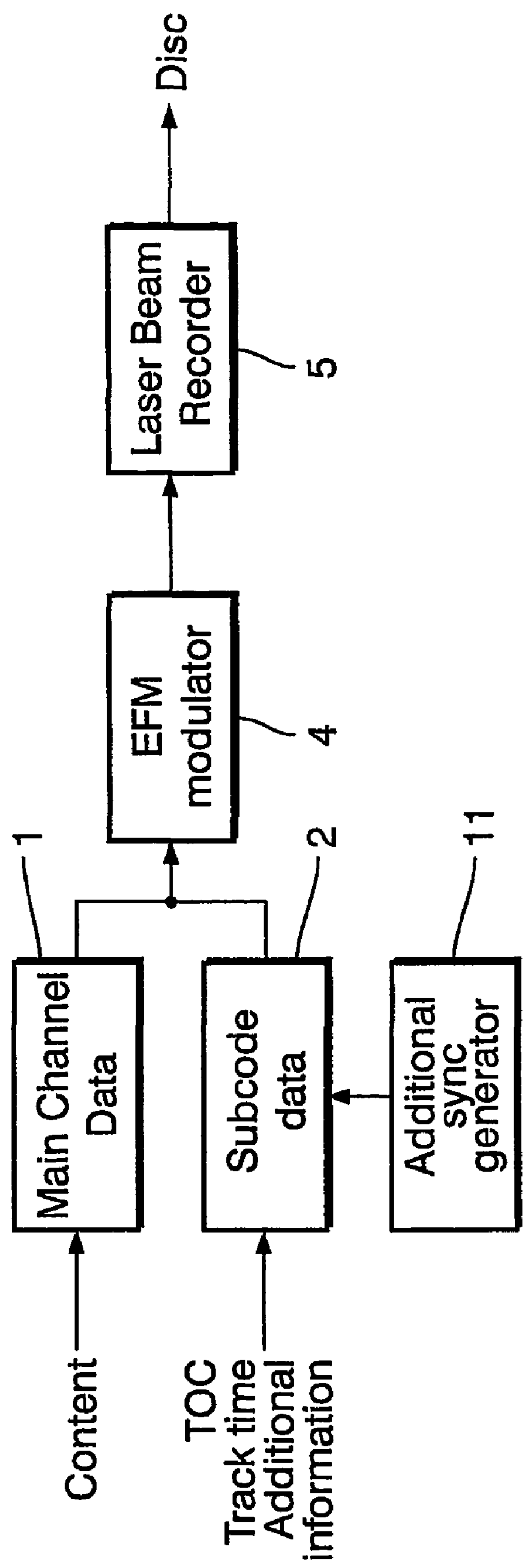
Figure 7:
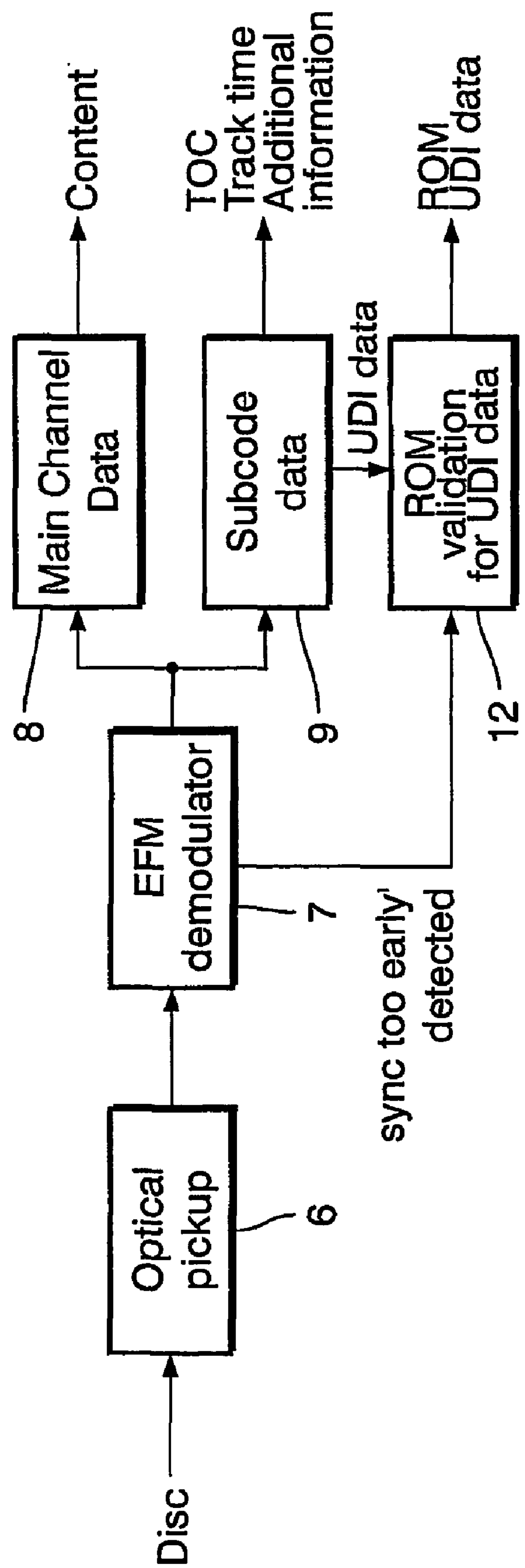

The invention will now be explained more in detail with reference to the Figures, in which FIG. 1 shows the mastering of TOC entries in an non-standard way, FIG. 2 shows a block diagram of an encoder according to a first embodiment of the invention, FIG. 3 shows a block diagram of a decoder according to a first embodiment of the invention, FIG. 4 shows a Q-channel subcode frame comprising additional synchronization symbols according to the invention, FIG. 5 illustrates the calculation of CRC symbols for such a subcode frame, FIG. 6 shows a block diagram of an encoder according to a second embodiment of the invention, and FIG. 7 shows a block diagram of a decoder according to the second embodiment of the invention.

FIG. 1 illustrates how TOC entries can be written in a non-standard way. As can be seen in the left column, each TOC entry, e.g. TOC entry A0, is written subsequently three times. However, while according to the standard way after three times writing TOC entry A0 three times A1 would have been written, this sequence is mixed up by exchanging the A1 and A2 pointers when writing all the TOC entries to the record carrier, e.g. a ROM disc. Said method can particularly be applied to CD audio or CD-ROM for mastering the TOC entries in mode-1.

When accessing such a record carrier a drive will usually reconstruct the TOC table in the standard way, i.e. when copying such a record carrier, the drive will write the TOC entries in the standard way as shown in the right column.

Other ways of mastering TOC entries in a detectable non-standard way include the usage of a mixing-up pattern which extends over a large number of frames, the repetition of every TOC entry or at least some of the TOC entries for a number different from the standard number, which is three times for CD audio or CD-ROM. Further, the TOC entries may only be mastered in a non-standard way in a confined area, e.g. only in a part of the lead-in of an optical record carrier.

An encoder according to a first embodiment for writing TOC entries in a non-standard way is shown in FIG. 2. Therein content is encoded into main channel data by a main channel data unit 1 and additional information such as table of content information and track timing information is encoded into subcode data by a subcode data unit 2. A TOC order modulator 3 is provided according to the present invention to modulate the order in which the TOC entries are written which order can be determined by a modulation signal. Said TOC order modulator can also be designed to modify the way in which TOC entries are written in any other non-standard way. An EFM modulator 4 is further provided for interleaving and modulating the main channel data and the subcode data into a channel bit stream which is finally recorded on a disc by a laser beam recorder 5.

FIG. 3 shows a first embodiment of a decoder according to the present invention which is adapted for detection of the way in which TOC entries are written. Therein an optical pick-up unit 6 is provided for accessing and reading a disc. The read channel bit stream is demodulated by an EFM demodulator 7 into main channel data processed by a main channel data unit 8 into the actual content and into subcode data by a subcode data unit 9. Said subcode data are also provided to a TOC order demodulator 10 detecting the way in which TOC entries are written, i.e. detecting if TOC entries are written in a standard or non-standard way. A demodulated signal is outputted as a result indicating if the accessed disc is an original (if TOC entries are written in a non-standard way) or a copy (if TOC entries are written in a standard way). Said information can be exploited to allow or prevent the output of a unique disc identifier or to allow or prevent further copying of said disc.

With reference to FIGS. 4 and 5 a further embodiment for allowing a replay device to distinguish between an original and a copy shall be illustrated. FIG. 4 shows a Q-channel subcode frame according to said embodiment. Said subcode frame comprises in total 98 bits and has several fields: a synchronization field 20 comprising synchronization symbols S0, S1 (2 bits), a control field 21 (4 bits), an address field 22 (4 bits), a payload field 23 (70 bits), a cyclic redundancy check (CRC) field 24 (16 bits) and an extra synchronization field 25 comprising additional synchronization symbols S0, S1 (2 bits). According to said embodiment said additional subcode synchronization symbols in field 25 are added in mode-6 of the subcode Q-channel during mastering. Despite said additional synchronization symbols the remaining subcode data in said subcode frame as well as the main channel data can be retrieved correctly. However, copying of the additional synchronization symbols is impossible, since there are no valid subcode byte values, in particular since a detector does not expect to find synchronization symbols at such a position within a subcode frame. Moreover, a detector would correct the detected additional synchronization symbols into correct subcode data symbols, e.g. into subcode data symbols having symbol value zero.

The detection of additional synchronization symbols can be done by an interrupt saying "synchronization too early" or a similar signal. The firmware of a drive could exploit such an interrupt or a similar signal by only giving the payload, e.g. a UDI (Unique Disc Identifier) or a ROM disc identifier, to the outside if the additional synchronization symbols have been detected.

FIG. 5 illustrates how auxiliary data bits AUX for an auxiliary data field 26 are calculated. In a first step, said auxiliary data bits AUX are set to zero (0x00) and the CRC bits for CRC field 27 (16 bits) are calculated over the control field 21, the address field 22, the payload field 23 and the AUX field 26. The last two bits of said CRC field 27, i.e. of the calculated CRC bits, are placed in the AUX field 26, and in a second step the CRC bits for CRC field 27 are calculated again over the control field 21, the address field 22, the payload field 23 and the AUX field 26, now including new auxiliary data (0x03).

The resulting 16 bit CRC data have the property that the last two bits (bit 1 and 0) are zero. The first 14 CRC bits of said calculated CRC data are finally placed in the CRC field 28 (14 bits), while the last two subcode bits in the EFM frame are replaced by the additional synchronization symbols S0 and S1 (field 25).

During detection these additional synchronization bits will most probably render 2 bits with value zero in the Q-channel and result in a synchronization-too-early interrupt. When a disc is copied "raw", the last 2 bits will be zero, but during detection of the copy there will be no synchronization-too-early interrupt. The readout result of the Q-channel content will be the same for the original disc and the disc made with the raw-copy process.

FIG. 6 shows a block diagram of an encoder according to a second embodiment of the invention employing the use of additional synchronization symbols. Compared to the encoder shown in FIG. 2 an additional synchronization generator 11 is provided instead of the TOC order modulator for generating and embedding additional synchronization symbols of particular or all subcode channels. The EFM demodulator 7 of a decoder as shown in FIG. 7 will then be able to generate an interrupt "synchronization too early" in response to the detection of such additional synchronization symbols at a location within a frame where a synchronization symbol is not expected. Said interrupt can be provided to a ROM validation unit for validating the disc itself or disc ID data (e.g. UDI data) received from the subcode data unit 9, i.e. the output of said disc ID data can be controlled such that it is only outputted if an interrupt "synchronization too early" is received indicating that the accessed disc is an original but not a copy.

The present invention is not limited to the above-described embodiments. For example, the idea of mastering TOC entries in a non-standard way and the use of additional synchronization symbols can also be used simultaneously to even more increase the security of distinguishing between an original and a copy. Further, the way of embedding additional synchronization symbols, the number thereof and the location within a subcode frame can be different from the shown embodiment.

The invention claimed is:

1. A method of using a replay device for detecting a copied record carrier having a table of contents, the method comprising acts of:

providing at least one encoder device for mastering a table of contents on an original record carrier to include entries in a non-standard sequence, a standard table of contents having entries in a standard sequence indicating that the corresponding at least one record carrier is a copy;

storing subcode data on said original record carrier in subcode frames of a subcode channel, each subcode frame comprising synchronization symbols and data symbols at predetermined positions within said subcode frame; and assigning and storing a number of additional synchronization symbols to at least one subcode frame at positions provided for data symbols;

providing at least one decoder device for generating, during read-out of said subcode channel, a check signal indicating presence or absence of said additional synchronization symbols; and preventing copying of said record carrier if said check signal indicates the absence of additional synchronization symbols in said subcode frames, wherein the record carrier is an optical storage disk.

2. The method according to claim 1, wherein a sequence of entries in the table of contents on the original record carrier is mixed up compared to a standard sequence of entries.

3. The method according to claim 1, wherein a number of repetitions of entries in the table of contents on the original record carrier is varied compared to a standard number of repetitions.

4. The method according to claim 1, wherein entries in the table of contents are mastered only in a predetermined area on said original record carrier in a detectable non-standard way.

5. The method according to claim 1, comprising acts of:

storing a unique identifier uniquely identifying said record carrier in said subcode frames; and outputting said unique identifier only if said check signal indicates the presence of additional synchronization symbols within said subcode frames.

6. The method according to claim 1, wherein additional synchronization symbols are stored at the end of each subcode frame.

7. The method according to claim 1, wherein said subcode frames are part of a subcode Q-channel, as defined in the Red Book for CD audio or in the Yellow Book for CD-ROM.

8. The method according to claim 1, wherein said data symbols stored in said subcode frames comprise a unique identifier and error correction data and wherein said additional synchronization symbols are stored to said at least one subcode frame on the cost of said unique identifier or said error correction data.

9. A method of using a read-out of at least one record carrier having a table of contents for indicating whether the at least one record carrier is authorized and wherein non-standard tables of contents are mastered on authorized record carriers to include entries in a non-standard sequence, a standard table of contents having entries in a standard sequence, the method comprising acts of:

providing at least one decoder device for reading said table of contents;

checking if said table of contents is standard or non-standard; and outputting a signal indicating if said table of contents is standard or non-standard, a standard table of contents indicating that the record carrier is not authorized and a non-standard table of contents indicating that the record carrier is authorized, wherein, on the record carrier, subcode data in subcode frames of a subcode channel is stored, each subcode frame comprising synchronization symbols and data symbols at predetermined positions within said subcode frame;

reading-out said subcode channel;

checking if additional synchronization symbols are stored to at least one subcode frame at positions provided for data symbols;

outputting a check signal indicating the presence or absence of said additional synchronization symbols in at least one subcode frame; and preventing copying of said record carrier if said check signal indicates the absence of additional synchronization symbols in said subcode frames, wherein the record carrier is an optical storage disk.

10. The method according to claim 9, wherein a unique identifier uniquely identifying said record carrier read from said record carrier is only outputted if said table of contents is non-standard.

11. The method according to claim 9, wherein copying of said record carrier is prevented if said table of contents is non-standard.

12. A method of using at least one replay device for producing a read-out of a record carrier on which subcode data is stored in subcode frames of a subcode channel, the method comprising acts of:

pre-recording the record carrier by an encoder each subcode frame to include synchronization symbols and data symbols at predetermined positions within said subcode frame reading out said subcode channel;

checking if additional synchronization symbols are stored to at least one subcode frame at positions provided for the data symbols; and outputting a check signal indicating the presence or absence of said additional synchronization symbols in at least one subcode frame, absence of the additional synchronization symbols indicating that the record carrier is a copy and presence of the additional synchronization symbols indicating that the record carrier is an original, wherein the record carrier is an optical storage disk.

13. An apparatus for detection of a copied record carrier having a table of contents, the apparatus comprising:

control unit for mastering a table of contents on an original record carrier to include entries in a non-standard sequence, a standard table of contents having entries in a standard sequence indicating that the corresponding at least one record carrier is a copy;

a storage for storing subcode data on said record carrier in subcode frames of a subcode channel, each subcode frame comprising synchronization symbols and data symbols at predetermined positions within said subcode frame, and assigning unit for assigning and storing a number of additional synchronization symbols to at least one subcode frame at positions provided for data symbols so that during read-out of said subcode channel a check signal is generated indicating the presence or absence of said additional synchronization symbols and copying of said record carrier is prevented if said check signal indicates the absence of additional synchronization symbols in said subcode frames, wherein the original record carrier is an optical storage disk.

14. An apparatus for producing a read-out of a record carrier on which subcode data are stored in subcode frames of a subcode channel, the record carrier having each subcode frame prerecorded to include synchronization symbols and data symbols at predetermined positions within said subcode frame, the apparatus comprising:

a reading unit for read-out of said subcode channel, a checking unit for checking by a processor if additional synchronization symbols are stored to at least one subcode frame at positions provided for the data symbols, and an output unit for outputting a check signal indicating the presence or absence of said additional synchronization symbols in at least one subcode frame, absence of the additional synchronization symbols indicating that the record carrier is a copy and presence of the additional synchronization symbols indicating that the record carrier is an original, wherein the record carrier is an optical storage disk.

15. A replay device for playing a record carrier, the replay device comprising:

a decoder device for decoding subcode data stored in subcode frames of a subcode channel, each subcode frame is prerecorded to include synchronization symbols and data symbols at predetermined positions within said subcode frame, subcode frames of original record carriers are prerecorded to include at least one subcode frame comprising a number of additional synchronization symbols assigned and stored by an encoder at positions provided for data symbols, wherein during read-out of the record carrier of said subcode channel, a check signal can be generated by the decoder device in response to detection of said additional synchronization symbols, absence of the additional synchronization symbols indicating that the record carrier is a copy and presence of the additional synchronization symbols indicating an original record carrier, wherein the record carrier is an optical storage disk.

* * * * *